(12) United States Patent
Miller

(10) Patent No.: US 11,644,182 B1
(45) Date of Patent: May 9, 2023

(54) LED MARKER WITH VERTICAL MOUNT

(71) Applicant: Buyers Products Company, Mentor, OH (US)

(72) Inventor: Michael Miller, Brunswick, OH (US)

(73) Assignee: BUYERS PRODUCTS COMPANY, Mentor, OH (US)

( * ) Notice: Subject to any disclaimer, the term of this patent is extended or adjusted under 35 U.S.C. 154(b) by 0 days.

(21) Appl. No.: 17/736,370

(22) Filed: May 4, 2022

(51) Int. Cl.
| | |
|---|---|
| *F21V 17/12* | (2006.01) |
| *F21V 21/00* | (2006.01) |
| *E01H 5/06* | (2006.01) |
| *F21V 23/00* | (2015.01) |
| *F21Y 115/10* | (2016.01) |

(52) U.S. Cl.
CPC .............. *F21V 17/12* (2013.01); *E01H 5/066* (2013.01); *F21V 21/00* (2013.01); *F21V 23/002* (2013.01); *F21Y 2115/10* (2016.08)

(58) Field of Classification Search
CPC ..... B60Q 1/26–46; E01H 5/066; F21V 17/12; F21V 21/00; F21V 23/002; F21Y 2115/10
See application file for complete search history.

(56) References Cited

U.S. PATENT DOCUMENTS

| | | | |
|---|---|---|---|
| 6,371,633 B1 * | 4/2002 | Davis .................. | B60Q 1/2657 |
| | | | 362/540 |
| 9,902,312 B1 * | 2/2018 | Buechs .................. | E01H 5/061 |
| 11,110,855 B1 * | 9/2021 | Buechs .................. | B60Q 1/50 |

* cited by examiner

*Primary Examiner* — Jason M Han
(74) *Attorney, Agent, or Firm* — Emerson, Thomson & Bennett, LLC; Roger D. Emerson

(57) ABSTRACT

Provided in this disclosure is an apparatus for marking an implement, such as a snow plow. An elongated tubular member retains an illuminated member such an LED element within the interior. Conductor wiring connects a source of electrical energy to the LED. An enclosing cap includes a crimped end portion secured to the bottom end of the elongated tubular member. A cylindrical end portion has a hollow interior for admitting the conductor wiring for connection to the source of electrical energy. A perpendicular mounting bracket has a horizontal mounting surface and a vertical mounting surface, formed together at a right angle. The horizontal mounting surface is configured for connecting to the cylindrical end portion of the enclosing cap so that the elongated tubular member is disposed in a substantially vertical position. The vertical mounting surface is configured for connecting to a vertical portion of the snow plow.

14 Claims, 4 Drawing Sheets

LED MARKER WITH VERTICAL MOUNT

I. BACKGROUND

A. Technical Field

This invention generally pertains to the field of visible markers for equipment. This invention particularly pertains to the field of illuminated markers for defining the edges of snow plows mounted on the ends of vehicles, such as a truck.

B. Description of Related Art

Plows are most often used as a quick and efficient way to clear away snow, mud or debris, particularly for widespread use in plowing snow. When operating in darkness, the plow driver has to be constantly aware of the projected path of the plow blade relative to a curb placement, parked cars and other objects in the general path of the blade. Currently, it is known to have an illuminated plow marker mounted on top of the plow blade at each end to allow the driver to get some idea of the extent to which the plow blade will clear an object. Illumination makes it easier to see the markers in the dark and in poor visibility conditions, such as ice or snow. An example of such a plow marker is disclosed in U.S. Pat. No. 9,902,312.

Such prior art illuminated markers suffer from certain drawbacks. Such illuminated markers are necessarily mounted on a horizontal surface of the snow plow, in order to provide adequate mounting stability and allow the marker to have a vertical orientation. However, snow plows are typically curved in a vertical direction and do not include horizontal surfaces. Thus, it can be problematic to mount an illuminated marker, particularly to maintain a vertical orientation.

FIG. 1 of the aforementioned U.S. Pat. No. 9,902,312 shows markers mounted on a horizontal wing secured to the top of the plow. Such a surface is subject to buffeting from snow spilling over the top of the plow, and thus will not remain reliably oriented in a vertical direction, in order to remain effective. Moreover, a marker mounted in such a fashion can encounter snow and ice spilling over the end of the horizontal wing, and can thereby incur damage.

II. SUMMARY

Provided in this disclosure is an apparatus for marking an implement such as a snow plow. The apparatus includes an elongated tubular member having top and bottom ends for transmitting at least a portion of light from its interior. An illuminated member is retained within the interior of the elongated tubular member and extends between the top and bottom ends. Conductor wiring connects a source of electrical energy to the elongated illuminated member. An enclosing cap includes a crimped end portion configured to be secured to the bottom end of the elongated tubular member. The enclosing cap also includes a cylindrical end portion having a hollow interior for admitting the conductor wiring for connection to the source of electrical energy. A perpendicular mounting bracket has a horizontal mounting surface and a vertical mounting surface, formed together at a right angle. The horizontal mounting surface is configured for connecting to the cylindrical end portion of the enclosing cap so that the elongated tubular member is disposed in a substantially vertical position. The vertical mounting surface is configured for connecting to a vertical portion of the implement.

In one aspect of the invention, the enclosing cap includes a nut portion formed integrally between the crimped end portion and the cylindrical end portion. The nut portion is configured to receive a wrench. Preferably, the nut portion is a configured as a hexagonal nut.

In another aspect of the invention, the horizontal mounting surface includes a hole for receiving the cylindrical end portion. The cylindrical end portion preferably includes a threaded exterior for receiving a securing nut, which is tightened along the threaded exterior to secure the enclosing cap against the horizontal mounting surface.

In yet another aspect of the invention, the vertical mounting surface includes one or more mounting holes for receiving a respective number of bolts for connecting to the vertical portion of the implement. For embodiments in which the implement is a snow plow blade, the vertical portion of the implement is preferably a vertical plow rib for supporting a moldboard of the snow plow blade. In such embodiments, the source of electrical energy can be an auxiliary power supply associated with the snow plow blade.

In a preferred embodiment, the apparatus includes a longitudinal vertical axis, such that the elongated tubular member, along with the crimped end portion and the cylindrical end portion of the enclosing cap, are all aligned collinear along the longitudinal vertical axis.

In one embodiment of the invention, the illuminated member includes an elongated illuminated member including an LED strip having at least one LED element. The LED strip is preferably configured for directionally transmitting light such that the elongated illuminated member includes an unlit side and a lit side extending along the longitudinal axis.

An alternate embodiment of the present invention includes an apparatus for marking a snow plow blade. An elongated tubular member extends along a longitudinal axis and has top and bottom ends for transmitting light from its interior. An illuminated member extends within the interior of the elongated tubular member between the top and bottom ends. Conductor wiring connects an auxiliary power supply associated with the snow plow blade to the elongated illuminated member. An enclosing cap includes a crimped end portion, a cylindrical end portion, and a nut portion. The crimped end portion is secured to the bottom end of the elongated tubular member. The cylindrical end portion has a hollow interior for admitting the conductor wiring for connection to the source of electrical energy. The nut portion is formed integrally between the crimped end portion and the cylindrical end portion and is configured to receive a wrench. The crimped end portion, the nut portion and the cylindrical end portion of the enclosing cap are collinear with the elongated tubular member along the longitudinal vertical axis. A perpendicular mounting bracket has a horizontal mounting surface and a vertical mounting surface, which are formed together at a right angle. The horizontal mounting surface includes a hole for receiving the cylindrical end portion. The cylindrical end portion includes a threaded exterior for receiving a securing nut. The securing nut is tightened along the threaded exterior to secure the enclosing cap against the horizontal mounting surface, so that the elongated tubular member is disposed in a substantially vertical position. The vertical mounting surface comprises one or more mounting holes for receiving respective bolts for connecting to a vertical plow rib for supporting a moldboard of the snow plow blade.

In the preceding alternate embodiment, the illuminated member can be an elongated illuminated member including an LED strip having at least one LED element. This LED strip is configured for directionally transmitting light such that the elongated illuminated member comprises an unlit side and a lit side extending along the longitudinal axis.

According to an aspect, the present invention provides mounting stability to a marker without mounting to a horizontal surface on a snow plow.

According to another aspect, the present invention enables mounting of a marker on a vertical portion of a snow plow, thereby ensuring a vertical orientation with adequate stability.

According to still another aspect, the present invention provides a marker that maintains vertical orientation during buffeting by snow and ice spilling over the top of the snow plow.

According to yet another aspect, the present invention provides a marker that is protected from buffeting damage by snow and ice spilling over the top of the snow plow.

According to a further aspect, the present invention can include a lighting system that provides sufficient illumination to ensure adequate visibility of the marker in extreme snow conditions.

Other benefits and advantages of this invention will become apparent to those skilled in the art to which it pertains upon reading and understanding of the following detailed specification.

III. BRIEF DESCRIPTION OF THE DRAWINGS

The disclosed marker may take physical form in certain parts and arrangement of parts, embodiments of which will be described in detail in this specification and illustrated in the accompanying drawings which form a part hereof and wherein.

IV. DETAILED DESCRIPTION

Figures 1A, 1B:
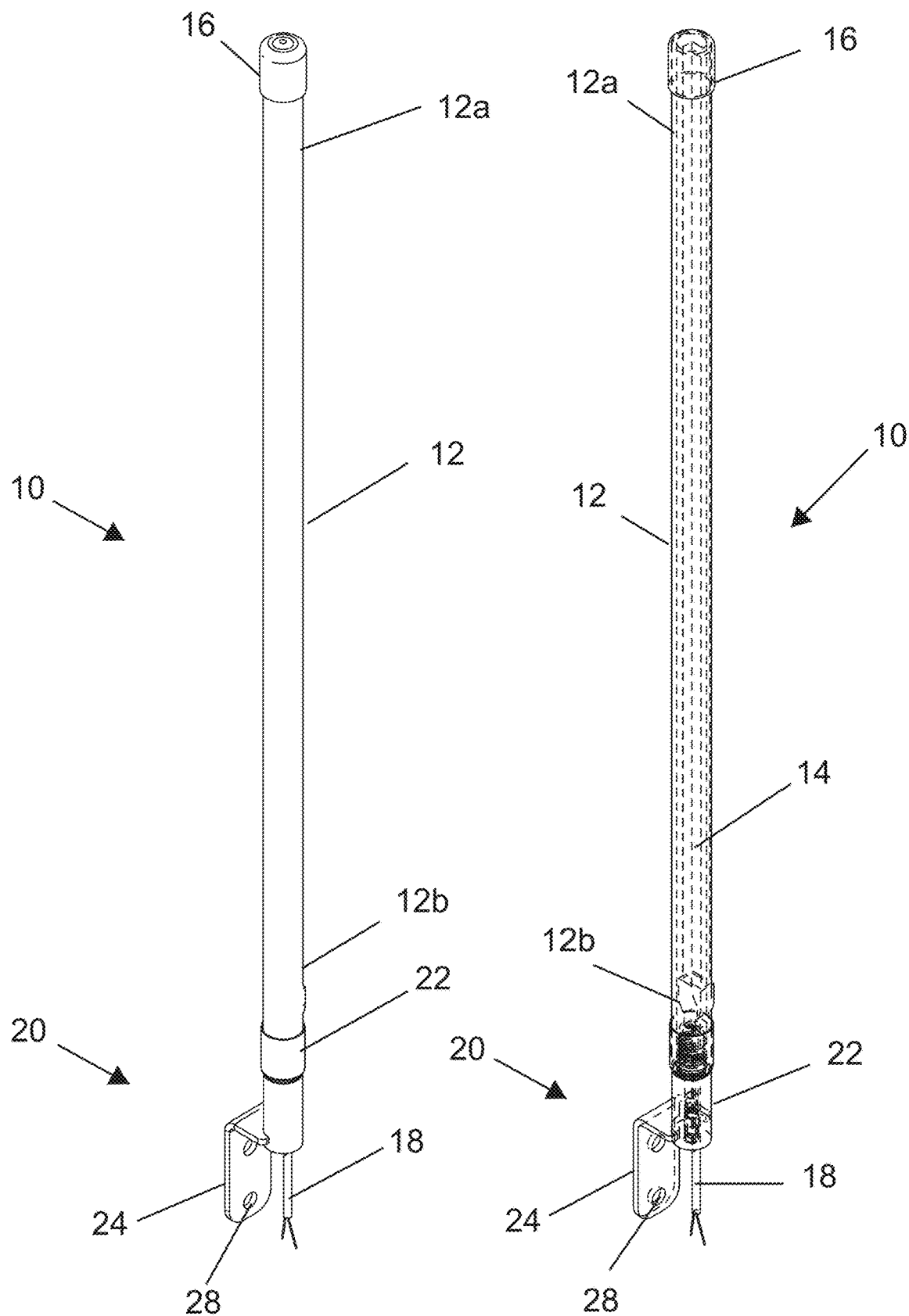
FIGS. 1A and 1B are respectively solid and phantom perspective views depicting a plow marker in accordance with an exemplary embodiment of the present invention.

Reference is now made to the drawings wherein the showings are for purposes of illustrating embodiments of the article only and not for purposes of limiting the same, and wherein like reference numerals are understood to refer to like components.

Figure 2:
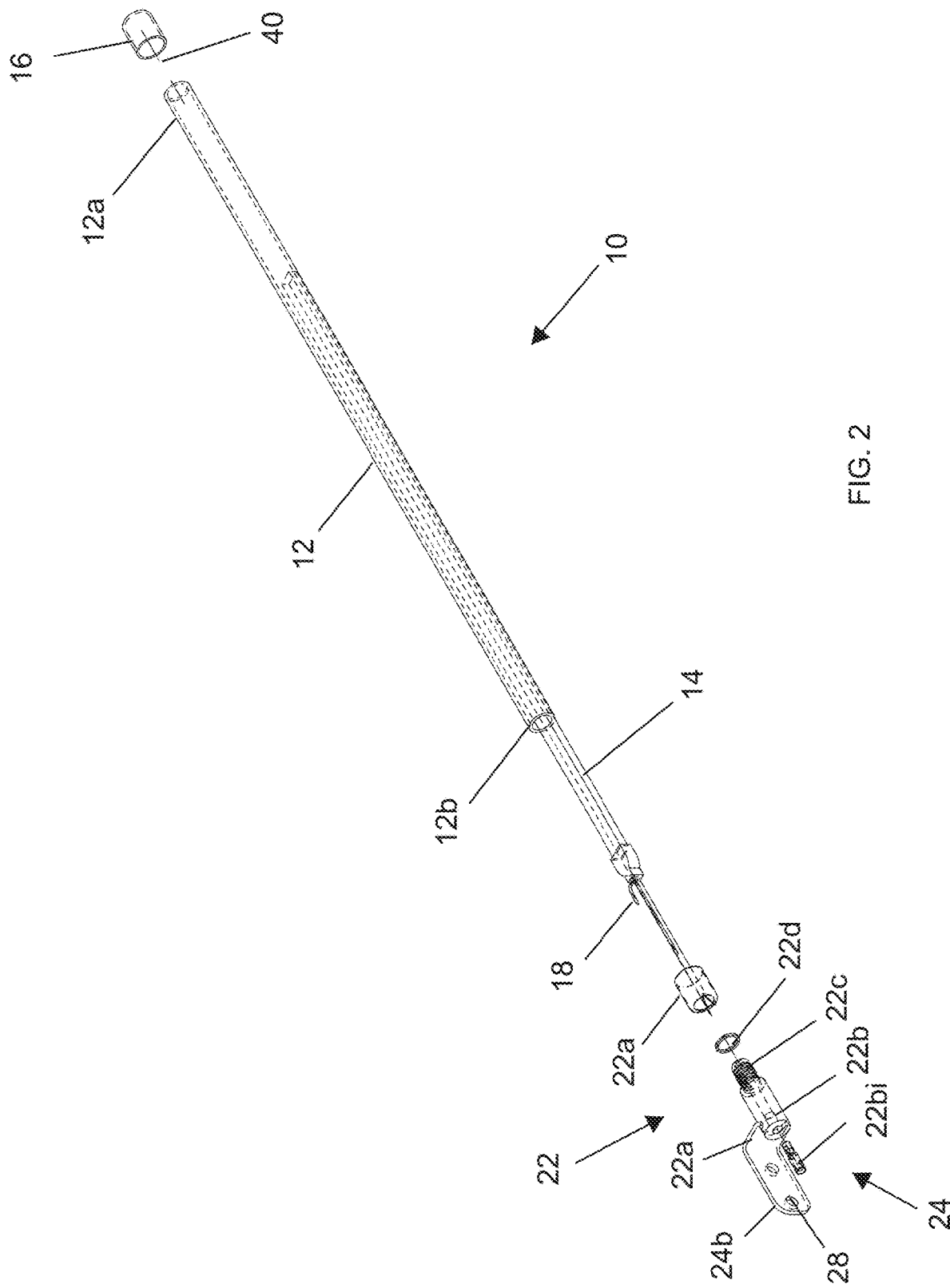
FIG. 2 is an exploded view of a plow marker in accordance with an exemplary-embodiment of the present invention.

FIGS. 1A, 1B, and 2 depict the illuminated marker 10 with vertical mount 20 in accordance with an exemplary embodiment. An elongated tubular member 12 has a top end 12a and a bottom end 12b. The elongated tubular member 12 transmits at least a portion of light from the interior of the elongated tubular member 12. The elongated tubular member 12 is preferably formed of a durable plastic material. This plastic material can be transparent or translucent and can be designed to allow a selected percentage of light transmission. The plastic material can include a selected pigment to impart a desired color scheme to the elongated tubular member 12. The elongated tubular member 12 is preferably hollow for retaining an illuminated member 14 extending within the interior of the elongated tubular member 12 between the top and bottom ends 12a, 12b. The top end 12a is preferably enclosed by a cap 16 to provide weather protection to the hollow interior and prevent moisture from entering therein. Conductor wiring 18 is used for connecting a source of electrical energy to the illuminated member 14, in accordance with principles that are well known and understood in the art.

With reference to FIGS. 1A, 1B, 2, and 3, the vertical mount 20 includes an enclosing cap 22 that cooperates with a perpendicular mounting bracket 24. The enclosing cap 22 includes a crimped end portion 22a which is configured to be secured to the bottom end 12b of the elongated tubular member 12. The enclosing cap 22 also includes a cylindrical end portion 22b having a hollow interior for admitting the conductor wiring 18 for connection to the source of electrical energy.

With continued reference to FIGS. 1A, 1B, 2 and 3, the perpendicular mounting bracket 24 has a horizontal mounting surface 24a and a vertical mounting surface 24h, where both of these surfaces 24a, 24b are formed together at a right angle. The horizontal mounting surface 24a is configured for connecting to the cylindrical end portion 22h of the enclosing cap 22 so that the elongated tubular member 12 is disposed in a substantially vertical position. The vertical mounting surface 24b is configured for connecting to a vertical portion of the implement, as will be explained in greater detail hereinbelow.

In an exemplary embodiment specifically depicted in FIGS. 1A, 1B, and 2, the cylindrical end portion 22b is formed integrally as one piece with the horizontal mounting surface 24a. A fitting end $22b_i$ is provided for insertion into the cylindrical end portion 22b. The cylindrical end portion 22b of this embodiment also includes a separate threaded exterior portion 22c that is formed integrally together as one piece, for connecting to the crimped end portion 22a, and hollow for allowing passage therethrough of the conductor wiring 18.

Figure 3:
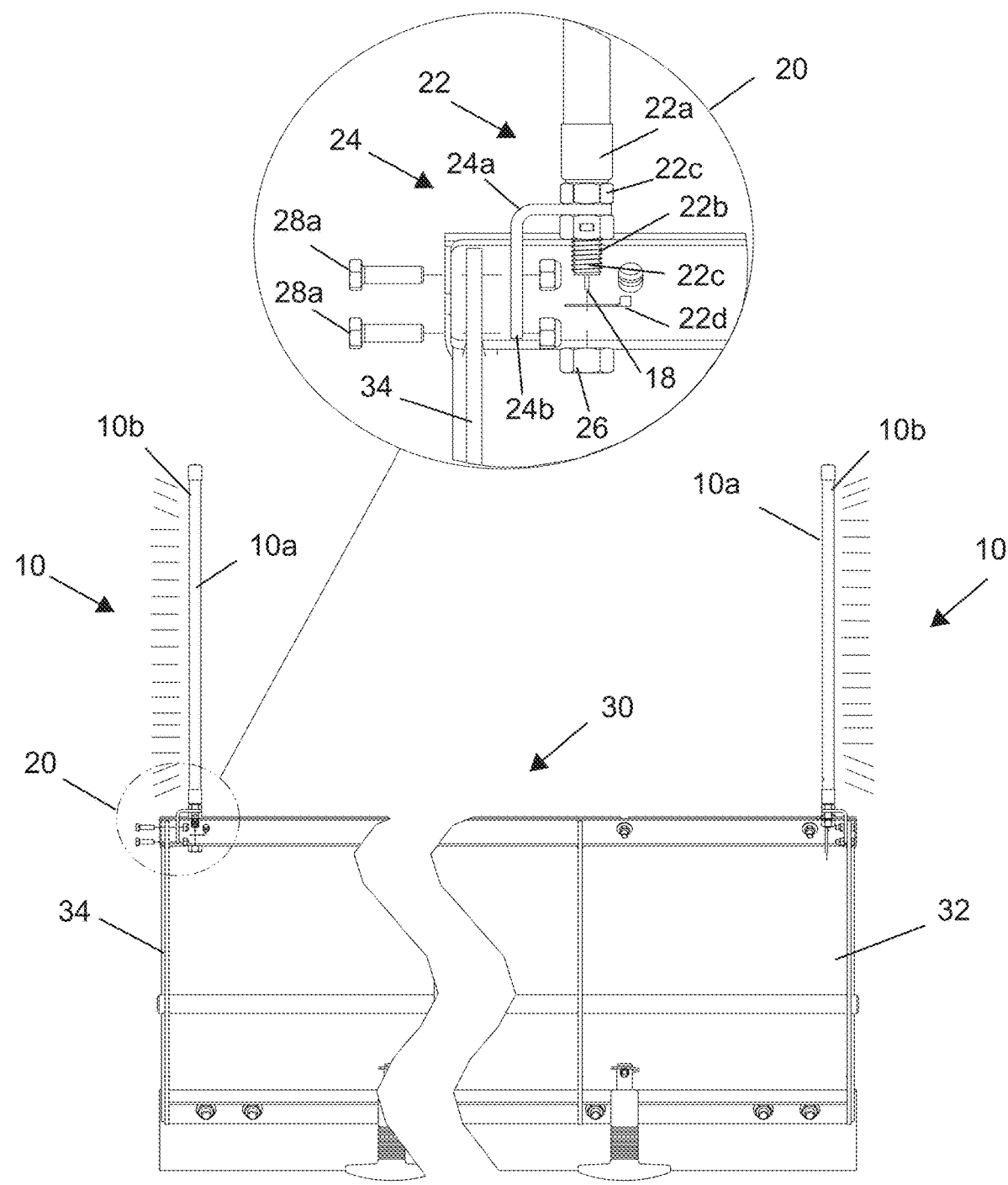
FIG. 3 is rear view of a plow including a plow marker in accordance with another exemplary embodiment of the present invention, also including a call out to show details of the vertical mount according to the present invention.

In another exemplary embodiment specifically depicted in FIG. 3 and the associated call out, the enclosing cap 22 includes a fitting portion 22e between the crimped end portion 22a and the cylindrical end portion 22b. As better shown in FIGS. 4A and 4B, fitting portion 22e includes a barbed fitting $22e_i$, a nut portion $22e_{ii}$ and a hollow threaded member $22e_{iii}$ which comprises the cylindrical end portion 22b. These elements of the fitting portion 22e are formed integrally as one piece. The barbed fitting $22e_i$ receives the bottom end 12b of the elongated tubular member 12 and has a ribbed surface to retain the bottom end 12b from slipping. A washer $22a_i$ made of nylon or other similar material is placed over the barbed fitting $22e_i$ to provide sealing once the joint is crimped. The crimped end portion 22a is a crimp sleeve made from a malleable material such as aluminum that is placed over the barbed fitting $22e_i$. The bottom end 12b of the elongated tubular member 12 is slid into the crimp sleeve, and the entire assembly then is crimped to the barbed fitting $22e_i$ making a permanent joint.

Figure 4A:
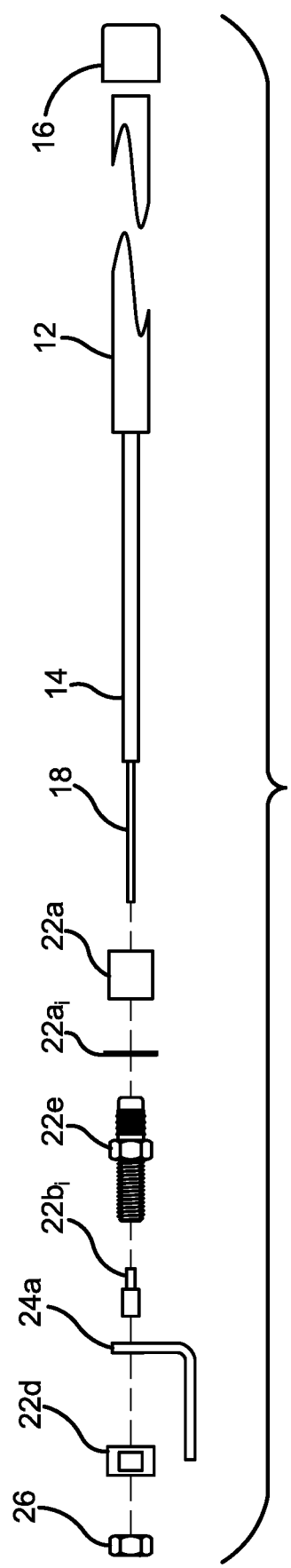
FIGS. 4A and 4B are respectively an exploded view of a plow marker and a barbed fitting in accordance with then exemplary embodiment of the present invention depicted in FIG. 3.
Figure 4B:
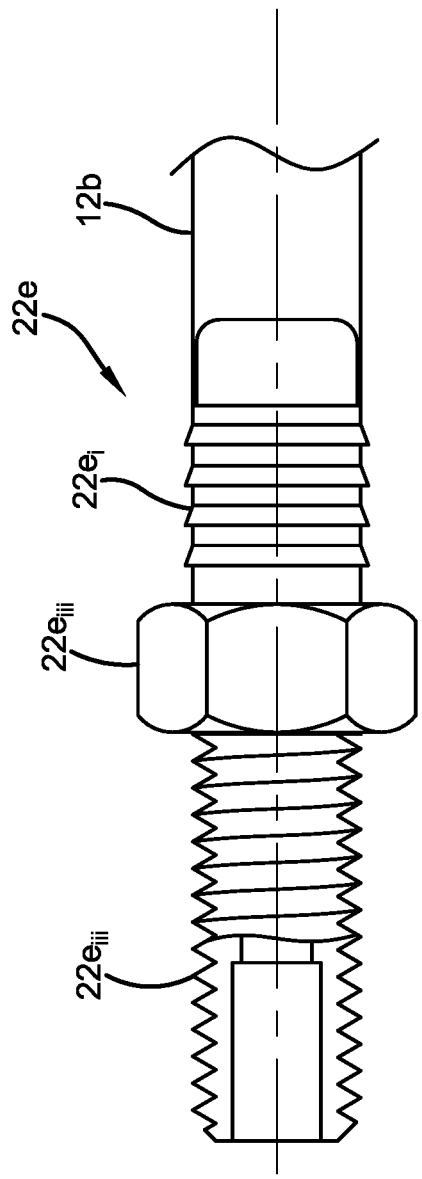

As also shown in FIGS. 4A and 4B, a nut portion $22e_{ii}$ is configured to receive a wrench. Preferably the nut portion $22e_{ii}$ is configured as a hexagonal nut, in order to be received and held steady by a standard wrench or other suitable tool.

In this way, the enclosing cap 22 can be held stable against rotation during manual installation, as explained in greater detail hereinbelow.

As specifically suggested by the rear view of the embodiment of FIG. 3, the horizontal mounting surface 24a includes a hole for receiving the cylindrical end portion 22b therethrough. As also shown in this embodiment, the threaded exterior portion 22c is formed integrally on the cylindrical end portion 22b for receiving a securing nut 26. The securing nut 26 is manually tightened along the threaded exterior portion 22c to secure the enclosing cap 22 against the horizontal mounting surface 24a. Preferably, the enclosing cap 22 is connected to the perpendicular mounting bracket 24 manually, in which a pair of wrenches respectively engage the nut portion 22e and the securing nut 26, to enable the securing nut 26 to be rotationally tightened by installation personnel to sandwich the horizontal mounting surface 24a therebetween. Additionally, a lock washer 22d is secured in between the securing nut 26 and the horizontal mounting surface 24a, to provide additional securing force to the securing nut 26. Alternatively, the horizontal mounting surface 24a and the cylindrical end portion 22b are secured by welding.

As shown in FIGS. 1A, 1B, 2, 3, 4A, and 4B, the vertical mounting surface 24b includes one or more mounting holes 28 for receiving respective bolt(s) 28a for connecting the vertical mount 20 to the vertical portion of the implement. As shown in the indicated figures, two mounting holes 28 with respective bolts 28a and associated nuts are shown. However, any number of holes 28 and bolts 28a can be used without departing from the invention.

As specifically shown in FIG. 3, the implement is preferably a snow plow blade 30 having a moldboard 32 for pushing snow and ice. The vertical portion of the implement is preferably a vertical plow rib 34 for supporting the moldboard 32 of the snow plow blade 30. The vertical mount 20 and thus the entire illuminated member 10 is preferably mounted to the outermost vertical plow ribs 32 of the plow 30. However, the illuminated member 10 and related components can be installed on any of the vertical ribs 32 or adapted to any other vertical surface all without departing from the invention. In this embodiment, the conductor wiring 18 can be connected to a source of electrical energy which is preferably an auxiliary power supply, associated with the snow plow blade 30, as such aspects are well understood to those having skill in the art.

As specifically depicted in FIGS. 2 and 3 and evident from FIGS. 1A and 1B, the illuminated marker 10 and principal components thereof are configured to align with a longitudinal vertical axis 40. Specifically, the elongated tubular member 12 and the crimped end portion 22a and the cylindrical end portion 22b of the enclosing cap 22 are configured to be collinear along the longitudinal vertical axis 40 when assembled together into the illuminated marker 10. However, any alternative configuration of these components could also be contemplated without departing from the invention.

As shown in the embodiment of FIGS. 1A, 1B and 2, the illuminated member is an elongated illuminated member 14 including an LED strip having one or more LED elements, preferably a plurality of LED elements. The LED strip of the elongated illuminated member 14 is preferably configured to have all of the LED elements on a single side of the LED strip. The LED strip is then oriented flat within the elongated tubular member 12 so that all of the LED elements are facing outwardly in the same direction. In this manner, the LED strip is configured for directionally transmitting light such that the illuminated marker 10 includes an unlit side 10a and a lit side 10b (FIG. 3) along the extent of the longitudinal axis 40.

Installation instructions are now provided herewith that are especially applicable to the embodiment depicted in FIG. 3:

1. Install the marker as shown below to a vertical surface/plow rib using the 5/16" nuts and screws through the holes in the marker;
   a. Orient the markers towards the inside of the plow as shown in the figure below to ensure that the lit side of the marker faces outward.
   b. To prevent galling, lightly coat threads with anti-seize compound and use only hand tools.
2. Orient the ground wire eyelet appropriately and tighten e hex nut to hold the eyelet in place.
3. Install bullet connector into base of threaded stud.
4. Route wire along plow moldboard, sector, and A-frame and secure while avoiding all pinch points (e.g. pivot stops, stacking stops, trip springs, etc. . . . )
   a. Be sure to allow enough slack for moldboard trip, side to side pivot, and lift frame/a-frame extension.
   b. During install, allowable wire length for side to side pivot is best found by pivoting the plow to the side opposite of the wire install. For example—pivot right while installing wire on left half of moldboard.
   c. If the path of hydraulic lines is clear from chafing, then secure the wire to the hydraulic line using cable ties to route the cable from the A-frame to the lift frame and up towards the electrical tie in.
5. Connect the power and ground wires to appropriate sources.
   a. Possible locations for connecting power to illuminated Plow Markers
      i. Tap/splice into the existing plow light positive wire and ground (parking light or low beam) Using the parking light circuit could act as a secondary turn signal.
      ii. Connect positive to a separate switch. Ground at battery.
      iii. Strobe function can be achieved with Buyers Products LED strobe controller (5621002) and a separate switch.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof

Having thus described the invention, it is now claimed:

1. An apparatus for marking an implement, comprising:
    an elongated tubular member having top and bottom ends for transmitting at least a portion of light from an interior, for retaining an illuminated member extending within the interior of the elongated tubular member between the top and bottom ends;
    conductor wiring for connecting a source of electrical energy to the elongated illuminated member;
    an enclosing cap including a crimped end portion configured to be secured to the bottom end of the elongated tubular member, wherein the enclosing cap also including a cylindrical end portion having a hollow interior for admitting the conductor wiring for connection to the source of electrical energy; and
    a perpendicular mounting bracket having a horizontal mounting surface and a vertical mounting surface, formed together at a right angle, wherein the horizontal mounting surface is configured for connecting to the cylindrical end portion of the enclosing cap so that the elongated tubular member is disposed in a substantially vertical position, and wherein the vertical mounting surface includes a mounting structure configured for connecting the vertical mounting surface to a vertical portion of the implement.

2. The apparatus of claim 1; wherein the enclosing cap further comprises a nut portion formed integrally between the crimped end portion and the cylindrical end portion, the nut portion configured to receive a wrench.

3. The apparatus of claim 2, wherein the nut portion is configured as a hexagonal nut.

4. The apparatus of claim 1, wherein the horizontal mounting surface comprises a hole for receiving the cylindrical end portion, and wherein the cylindrical end portion comprises a threaded exterior for receiving a securing nut, such that the securing nut is tightened along the threaded exterior to secure the enclosing cap against the horizontal mounting surface.

5. The apparatus of claim 1, wherein the horizontal mounting surface and the cylindrical end portion are secured by welding.

6. The apparatus of claim 1, wherein the mounting structure of the vertical mounting surface comprises at least one mounting hole for receiving at least one respective bolt for connecting to the vertical portion of the implement.

7. The apparatus of claim 1, wherein the implement comprises a snow plow blade, and wherein the vertical portion of the implement comprises a vertical plow rib for supporting a moldboard of the snow plow blade.

8. The apparatus of claim 7, wherein the source of electrical energy comprising an auxiliary power supply associated with the snow plow blade.

9. The apparatus of claim 1, further comprising a longitudinal vertical axis, wherein the elongated tubular member and the crimped end portion and the cylindrical end portion of the enclosing cap are collinear along the longitudinal vertical axis.

10. The apparatus of claim 1, wherein the illuminated member comprises an elongated illuminated member including at least one LED element.

11. The apparatus of claim 10, wherein the LED is an LED strip is configured for directionally transmitting light such that the elongated illuminated member comprises an unlit side and a lit side along the extent of a longitudinal axis of the elongated illuminated member.

12. An apparatus for marking a snow plow blade, comprising:
    an elongated tubular member extending along a longitudinal axis and having top and bottom ends for transmitting at least a portion of light from an interior, for retaining an illuminated member extending within the interior of the elongated tubular member between the top and bottom ends;
    conductor wiring for connecting an auxiliary power supply associated with the snow plow blade to the elongated illuminated member;
    an enclosing cap including a crimped end portion, a cylindrical end portion, and a nut portion, wherein the crimped end portion is configured to be secured to the bottom end of the elongated tubular member, wherein the cylindrical end portion having a hollow interior for admitting the conductor wiring for connection to the source of electrical energy, wherein the nut portion is formed integrally between the crimped end portion and the cylindrical end portion and configured to receive a wrench, wherein the crimped end portion, the nut portion and the cylindrical end portion of the enclosing cap are collinear with the elongated tubular member along the longitudinal vertical axis; and
    a perpendicular mounting bracket having a horizontal mounting surface and a vertical mounting surface, formed together at a right angle, wherein the horizontal mounting surface comprises a hole for receiving the cylindrical end portion, and wherein the cylindrical end portion comprises a threaded exterior for receiving a securing nut, such that the securing nut is tightened along the threaded exterior to secure the enclosing cap against the horizontal mounting surface, so that the elongated tubular member is disposed in a substantially vertical position, and wherein the vertical mounting surface comprises at least one mounting hole for receiving at least one respective bolt for connecting to a vertical plow rib for supporting a moldboard of the snow plow blade.

13. The apparatus of claim 12, wherein the illuminated member is an elongated illuminated member including at least one LED element.

14. The apparatus of claim 12, wherein the LED is an LED strip is configured for directionally transmitting light such that the elongated illuminated member comprises an unlit side and a lit side extending along the longitudinal axis.

* * * * *